(12) United States Patent
Lipscomb et al.

(10) Patent No.: US 10,457,841 B2
(45) Date of Patent: Oct. 29, 2019

(54) ALLYL ACRYLATE CROSSLINKERS FOR PSAS

(71) Applicant: 3M INNOVATIVE PROPERTIES COMPANY, St. Paul, MN (US)

(72) Inventors: Corinne E. Lipscomb, St. Paul, MN (US); Kevin M. Lewandowski, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 236 days.

(21) Appl. No.: 15/504,427

(22) PCT Filed: Sep. 11, 2015

(86) PCT No.: PCT/US2015/049633
§ 371 (c)(1),
(2) Date: Feb. 16, 2017

(87) PCT Pub. No.: WO2016/040773
PCT Pub. Date: Mar. 17, 2016

(65) Prior Publication Data
US 2017/0233617 A1  Aug. 17, 2017

Related U.S. Application Data

(60) Provisional application No. 62/049,639, filed on Sep. 12, 2014.

(51) Int. Cl.
| | | |
|---|---|---|
| C09J 133/08 | (2006.01) | |
| C08F 220/18 | (2006.01) | |
| C08K 5/00 | (2006.01) | |
| C09J 133/02 | (2006.01) | |
| B05D 3/06 | (2006.01) | |
| C09J 5/06 | (2006.01) | |

(52) U.S. Cl.
CPC ............ C09J 133/08 (2013.01); B05D 3/067 (2013.01); C08F 220/18 (2013.01); C09J 5/06 (2013.01); C09J 2433/00 (2013.01)

(58) Field of Classification Search
CPC .............................. C09J 133/08; C08F 265/06
See application file for complete search history.

(56) References Cited

U.S. PATENT DOCUMENTS

| | | | |
|---|---|---|---|
| 2,572,951 A * | 10/1951 | Roedel | ................. C09D 125/14 |
| | | | 428/35.7 |
| 4,234,662 A | 11/1980 | Pastor | |
| 4,415,615 A | 11/1983 | Esmay | |
| 4,438,177 A * | 3/1984 | Potter | ..................... A61L 15/58 |
| | | | 428/355 AC |
| 5,276,110 A | 1/1994 | Zhou | |
| 5,416,127 A | 5/1995 | Chandran | |
| 5,506,279 A | 4/1996 | Babu | |
| 5,514,730 A | 5/1996 | Mazurek | |
| 5,534,391 A | 7/1996 | Wang | |
| 5,602,221 A | 2/1997 | Bennett | |
| 5,605,999 A | 2/1997 | Chu | |
| 5,741,543 A | 4/1998 | Winslow | |
| 5,902,836 A | 5/1999 | Bennett | |
| 6,231,714 B1 * | 5/2001 | Woods | .................... C07C 69/54 |
| | | | 156/275.7 |
| 6,852,781 B2 | 2/2005 | Savu | |
| 6,893,731 B2 | 5/2005 | Kausch | |
| 7,385,020 B2 | 6/2008 | Anderson | |
| 8,282,872 B2 | 10/2012 | Fujita | |
| 2007/0087206 A1 | 4/2007 | Soutar | |
| 2010/0313782 A1 | 12/2010 | Loccufier | |
| 2012/0288692 A1 | 11/2012 | Broyles | |
| 2012/0315474 A1 | 12/2012 | Licht | |
| 2014/0209968 A1 | 7/2014 | Ozai | |

FOREIGN PATENT DOCUMENTS

| | | |
|---|---|---|
| EP | 0 108 886 | 5/1984 |
| EP | 0372756 | 6/1990 |
| EP | 1772500 | 4/2007 |
| EP | 2385084 | 11/2011 |
| JP | 51-012857 | 1/1976 |
| JP | 61-112161 | 5/1986 |
| JP | 2004-83645 | 3/2004 |
| JP | 2004-83646 | 3/2004 |
| JP | 2010-067621 | 3/2010 |
| JP | 2010-235845 | 10/2010 |
| WO | WO 2004-092295 | 10/2004 |
| WO | WO 2007-030640 | 3/2007 |
| WO | WO 2011-038448 | 4/2011 |
| WO | WO 2011-068754 | 6/2011 |
| WO | WO 2012-148608 | 11/2012 |
| WO | WO 2012-177337 | 12/2012 |
| WO | WO 2014-172185 | 10/2014 |
| WO | WO 2015-157350 | 10/2015 |
| WO | WO 2016-036634 | 3/2016 |

OTHER PUBLICATIONS

Rodriguez, "Polymerization Strategies to overcome limiting monomer conversion in silicone-acrylic mimiemulsion polymerization", Feb. 2008, vol. 49, No. 3, pp. 691-696.

Rojo, "From Natural Products to Polymeric Derivatives of Eugenol": A New Approach for Preparation of Dental Composites and Orthopedic Bone Cements, Biomacromolecules, 2006, vol. 7, pp. 2751-2761.

Solomon, "Polymerization of Assymmetric Tetrafunctional Monomers. I. The Study of Radical Bulk Polymerization of Acrylic and Methacrylic Esters of 2-Allylphenol", Journal of Applied Polymer Science, 1967, vol. 11, pp. 1631-1639.

Stanzione, "Lignin Model Compounds as Bio-Based Reactive Diluents for Liquid Molding Resins", ChemSusChem, 2012, vol. 5, pp. 1291-1297.

(Continued)

*Primary Examiner* — Nicole M. Buie-Hatcher

(57) ABSTRACT

An (meth)acrylate pressure-sensitive adhesive copolymer is described prepared by crosslinking with a (meth)acrylic crosslinking monomer containing an allyl group.

16 Claims, No Drawings

(56) References Cited

OTHER PUBLICATIONS

Sun, "Synthesis and Characterization of Network Type Single Ion Conductors", Macromolecules, 2004, vol. 37, pp. 2219-2227.
Vani, Syntheses of allyl phenyl acrylates and their evaluation as reactive diluents in UV-curable coating compositions, Progress in Organic Coatings, 1993, vol. 21, pp. 339-352.
International Search Report for PCT International Application No. PCT/US2015/049633 dated Dec. 7, 2015, 5 pages.

* cited by examiner

ALLYL ACRYLATE CROSSLINKERS FOR PSAS

CROSS REFERENCE TO RELATED APPLICATIONS

This application is a national stage filing under 35 U.S.C. 371 of PCT/US2015/049633, filed Sep. 11, 2015, which claims the benefit of U.S. Application No. 62/049,639, filed Sep. 12, 2014, the disclosure of which is incorporated by reference in its/their entirety herein.

TECHNICAL FIELD OF THE INVENTION

This invention relates to novel crosslinking monomers and acrylic pressure sensitive adhesives and tape articles prepared therefrom. The adhesives are characterized by exhibiting an overall balance of adhesive and cohesive characteristics.

BACKGROUND OF THE INVENTION

Pressure sensitive tapes are virtually ubiquitous in the home and workplace. In its simplest configuration, a pressure sensitive tape comprises an adhesive and a backing, and the overall construction is tacky at the use temperature and adheres to a variety of substrates using only moderate pressure to form the bond. In this fashion, pressure sensitive tapes constitute a complete, self-contained bonding system.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A. V. Pocius in *Adhesion and Adhesives Technology: An Introduction*, 2$^{nd}$ Ed., Hanser Gardner Publication, Cincinnati, Ohio, 2002. These measurements taken together constitute the balance of properties often used to characterize a PSA.

With broadened use of pressure sensitive tapes over the years, performance requirements have become more demanding. Shear holding capability, for example, which originally was intended for applications supporting modest loads at room temperature, has now increased substantially for many applications in terms of operating temperature and load. So-called high performance pressure sensitive tapes are those capable of supporting loads at elevated temperatures for 10,000 minutes. Increased shear holding capability has generally been accomplished by crosslinking the PSA, although considerable care must be exercised so that high levels of tack and adhesion are retained in order to retain the aforementioned balance of properties.

There are two major crosslinking mechanisms for acrylic adhesives: free-radical copolymerization of multifunctional ethylenically unsaturated groups with the other monomers, and covalent or ionic crosslinking through the functional monomers, such as acrylic acid. Another method is the use of UV crosslinkers, such as copolymerizable benzophenones or post-added photocrosslinkers, such as multifunctional benzophenones and triazines. In the past, a variety of different materials have been used as crosslinking agents, e.g., polyfunctional acrylates, acetophenones, benzophenones, and triazines. The foregoing crosslinking agents, however, possess certain drawbacks which include one or more of the following: high volatility; incompatibility with certain polymer systems; generation of corrosive or toxic by-products; generation of undesirable color; requirement of a separate photoactive compound to initiate the crosslinking reaction; and high sensitivity to oxygen.

SUMMARY OF THE INVENTION

The present disclosure provides novel crosslinking monomers of the formula:

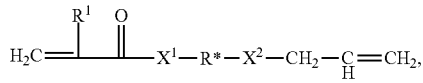

wherein
$R^1$ is H or $CH_3$,
$X^1$ is —O— or —$NR^1$—,
R* comprises an arylene group or an alkylene group, said alkylene group optionally substituted by an in-chain ether, ester, amide, urea, thioether or urethane functional group,
$X^2$ is a covalent bond, —O—, an ester group, a urea group or a urethane group when R* is an arylene group, and $X^2$ is —O—, an ester group, a urea group or a urethane group when R* is an alkylene group.

More particularly, the present disclosure further provides a syrup polymer composition comprising an allyl-functional (meth)acrylate copolymer and the crosslinking monomer derived from the novel crosslinking monomer. In one aspect, the disclosure provides a novel syrup polymer composition comprising a) a first component allyl-functional (meth)acrylate solute copolymer, b) a second component comprising at least one free-radically polymerizable solvent monomer, and c) the crosslinking monomer. The syrup composition comprises at least one crosslinking monomer in the solvent monomer component and/or the (meth)acrylic solute polymer comprises polymerized units derived from at least one crosslinking monomer.

The syrup polymer composition may be polymerized and cured to produce a pressure-sensitive adhesive.

The pressure-sensitive adhesives, the crosslinked compositions, of this disclosure provide the desired balance of tack, peel adhesion, and shear holding power, and further conform to the Dahlquist criteria; i.e. the modulus of the adhesive at the application temperature, typically room temperature, is less than 3×10$^6$ dynes/cm at a frequency of 1 Hz. In some embodiments, the storage modulus of the pressure sensitive adhesive at room temperature (25° C.) is less than 2×10$^6$ dynes/cm or 1×10$^6$ dynes/cm at a frequency of 1 Hz "Syrup polymer" refers to a solution of a solute polymer in one or more solvent monomers, the solution having a viscosity of from 500 to 10,000 cPs (centipoise) at 22° C. "Solution polymer" refers to a solution of a solute polymer in one or more organic solvents. (Meth)acrylic is inclusive of both methacrylic and acrylic.

Herein, "(meth)acryloyl" is inclusive of (meth)acrylate and (meth)acrylamide.

Herein, "(meth)acrylic" includes both methacrylic and acrylic.

Herein, "(meth)acrylate" includes both methacrylate and acrylate.

The term "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, 2-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

"Alkylene" means a linear unsaturated divalent hydrocarbon having from one to about twelve carbon atoms or a branched saturated divalent hydrocarbon having from three to about twelve carbon atoms, e.g., methylene, ethylene, propylene, 2-methylpropylene, pentylene, hexylene, and the like.

"Aryl" means a monovalent aromatic, such as phenyl, naphthyl and the like.

"Arylene" means a polyvalent, aromatic, such as phenylene, naphthalene, and the like.

The term heteroalkyl refers to an alkyl group, as just defined, having at least one catenary carbon atom (i.e. in-chain) replaced by a catenary heteroatom such as O, S, or N.

"Renewable resource" refers to a natural resource that can be replenished within a 100 year time frame. The resource may be replenished naturally or via agricultural techniques. The renewable resource is typically a plant (i.e. any of various photosynthetic organisms that includes all land plants, inclusive of trees), organisms of Protista such as seaweed and algae, animals, and fish. They may be naturally occurring, hybrids, or genetically engineered organisms. Natural resources such as crude oil, coal, and peat which take longer than 100 years to form are not considered to be renewable resources.

DETAILED DESCRIPTION

The present disclosure provides crosslinkable composition comprising an allyl-functional (meth)acrylate copolymer and a crosslinking monomer as described supra.

In some embodiments this disclosure provides a syrup polymer composition comprising a first component solute (meth)acrylate copolymer, and a second component solvent monomer. The crosslinking monomer may be incorporated as polymerized monomer units in the solute copolymer, providing pendent allyl groups thereto. Alternately, or in addition to, the second component solvent monomer component may contain the crosslinking agent.

In another embodiment, a polymerizable composition is provided comprising a monomer mixture of (meth)acrylate ester monomers, acid-functional monomers, optionally non-acid functional polar monomers, other optional monomers, and the crosslinking monomerin a suitable solvent. The solution may be solution polymerized, then crosslinked to provide a crosslinked pressure-sensitive adhesive.

The (meth)acrylic polymer, or the monomer mixture, comprises one or more (meth)acrylate ester monomers derived from a (e.g. non-tertiary) alcohol containing from 1 to 14 carbon atoms and preferably an average of from 4 to 12 carbon atoms.

Examples of monomers include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, and the like. In some embodiments, a preferred (meth)acrylate ester monomer is the ester of (meth)acrylic acid with isooctyl alcohol.

In some favored embodiments, the monomer is the ester of (meth)acrylic acid with an alcohol derived from a renewable source. A suitable technique for determining whether a material is derived from a renewable resource is through $^{14}C$ analysis according to ASTM D6866-10, as described in US2012/0288692. The application of ASTM D6866-10 to derive a "bio-based content" is built on the same concepts as radiocarbon dating, but without use of the age equations. The analysis is performed by deriving a ratio of the amount of organic radiocarbon ($^{14}C$) in an unknown sample to that of a modern reference standard. The ratio is reported as a percentage with the units "pMC" (percent modern carbon).

One suitable monomer derived from a renewable source is 2-octyl (meth)acrylate, as can be prepared by conventional techniques from 2-octanol and (meth)acryloyl derivatives such as esters, acids and acyl halides. The 2-octanol may be prepared by treatment of ricinoleic acid, derived from castor oil, (or ester or acyl halide thereof) with sodium hydroxide, followed by distillation from the co-product sebacic acid. Other (meth)acrylate ester monomers that can be renewable are those derived from ethanol and 2-methyl butanol.

The (e.g. pressure sensitive) adhesive (e.g. (meth)acrylic polymer and/or free-radically polymerizable solvent monomer) comprises one or more low $T_g$ (meth)acrylate monomers, having a $T_g$ no greater than 10° C. when reacted to form a homopolymer. In some embodiments, the low $T_g$ monomers have a $T_g$ no greater than 0° C., no greater than –5° C., or no greater than –10° C. when reacted to form a homopolymer. The $T_g$ of these homopolymers is often greater than or equal to –80° C., greater than or equal to –70° C., greater than or equal to –60° C., or greater than or equal to –50° C. The $T_g$ of these homopolymers can be, for example, in the range of –80° C. to 20° C., –70° C. to 10° C., –60° C. to 0° C., or –60° C. to –10° C.

Exemplary low $T_g$ monomers include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, and dodecyl acrylate.

Low $T_g$ heteroalkyl acrylate monomers include, but are not limited to, 2-methoxyethyl acrylate and 2-ethoxyethyl acrylate.

In some embodiments, the (e.g. pressure sensitive) adhesive (e.g. (meth)acrylic polymer and/or free radically polymerizable solvent monomer) comprises low $T_g$ monomer(s) having an alkyl group with 6 to 20 carbon atoms. In some embodiments, the low $T_g$ monomer has an alkyl group with 7 or 8 carbon atoms. Exemplary monomers include, but are not limited to, 2-ethylhexyl methacrylate, isooctyl methacrylate, n-octyl methacrylate, 2-octyl methacrylate, isodecyl methacrylate, and lauryl methacrylate. Likewise, some heteroalkyl methacrylates such as 2-ethoxy ethyl methacrylate can also be used.

In some embodiments, the (e.g. pressure sensitive) adhesive (e.g. (meth)acrylic polymer and/or free-radically polymerizable solvent monomer) comprises a high $T_g$ monomer, having a $T_g$ greater than 10° C. and typically of at least 15° C., 20° C., or 25° C., and preferably at least 50° C. Suitable high $T_g$ monomers include, for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, norbornyl (meth)acrylate, benzyl methacrylate, 3,3,5 trimethylcyclohexyl acrylate, cyclohexyl acrylate, N-octyl acrylamide, and propyl methacrylate or combinations.

In some embodiments, the (meth)acrylic polymer is a homopolymer. In other embodiments, the (meth)acrylic polymer is a copolymer. Unless specified otherwise, the term polymer refers to both a homopolymer and copolymer.

The $T_g$ of the copolymer may be estimated by use of the Fox equation, based on the $T_g$s of the constituent monomers and the weight percent thereof.

The (meth)acrylate ester monomer is present in an amount of 80 to 99 parts by weight based on 100 parts total monomer content used to prepare the polymer. Preferably the (meth)acrylate ester monomer is present in an amount of 90 to 95 parts by weight based on 100 parts total monomer content. When high and/or low $T_g$ monomers are included in a pressure sensitive adhesive, the adhesive may include at least 5, 10, 15, 20, to 30 parts by weight of such high $T_g$ monomer(s).

The (meth)acrylic polymer may optionally comprise an acid functional monomer (a subset of high $T_g$ monomers), where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. In some embodiments, the acid functional monomer is generally used in amounts of 0.5 to 15 parts by weight, preferably 0.5 to 10 parts by weight, based on 100 parts by weight total monomer or polymerized units.

The (meth)acrylic copolymer may optionally comprise other monomers such as a non-acid-functional polar monomer.

Representative examples of suitable polar monomers include but are not limited to 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxy)ethyl (meth)acrylate, 2-ethoxyethyl (meth)acrylate, 2-methoxyethoxyethyl (meth)acrylate, 2-methoxyethyl methacrylate, polyethylene glycol mono (meth)acrylates; alkyl vinyl ethers, including vinyl methyl ether; and mixtures thereof. Preferred polar monomers include those selected from the group consisting of 2-hydroxyethyl (meth)acrylate and N-vinylpyrrolidinone.

The polar monomer may be present in amounts of 0 to 20 parts by weight, preferably 1 to 5 parts by weight, based on 100 parts by weight total monomer.

When used, vinyl monomers useful in the (meth)acrylate polymer include vinyl esters (e.g., vinyl acetate and vinyl propionate), styrene, substituted styrene (e.g., α-methyl styrene), vinyl halide, and mixtures thereof. As used herein vinyl monomers are exclusive of acid functional monomers, acrylate ester monomers and polar monomers. Such vinyl monomers are generally used at 0 to 5 parts by weight, preferably 1 to 5 parts by weight, based on 100 parts by weight total monomer or polymerized units.

The crosslinking monomer has at least one (meth)acrylate group and at least one allyl group. Due to the greater reactivity of (meth)acryl groups in free-radical polymerization, it is preferentially incorporated into the polymer chain. This results in a copolymer having pendent allyl groups that may be crosslinked.

The crosslinking monomer is of the formula:

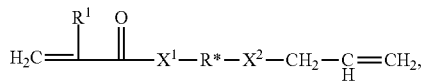

wherein
$R^1$ is H or $CH_3$,
$X^1$ is —O— or —$NR^1$—,
R* comprises an arylene group or an alkylene group, said alkylene group optionally substituted by an in-chain ether, ester, amide, urea, thioether or urethane functional group,
$X^2$ is a covalent bond, —O—, an ester group, a urea group or a urethane group when R* is an arylene group, and $X^2$ is —O—, an ester group, a urea group or a urethane group when R* is an alkylene group.

In some embodiments, R* is an arylene group represented as $R^{aryl}$, which may include phenyl, biphenyl, napthyl, anthracene, phenanthracene, which may be further substituted by one or more alkyl or alkyoxy groups, e.g. benzyl or methoxy. When R* is $R^{aryl}$, then $X^2$ is a covalent bond, an ester group, an ether group (—O—), a urea group (—NH—CO—NH—) or a urethane group (_NH—CO—O—) and may be represented as $X^{2\text{-}aryl}$.

In some embodiments, R* is an alkylene represented as $R^{alkyl}$, have 2 to 20 carbon atoms, the alkylene optionally substituted by a functional group including an ether, ester, amide, urea, thioether or urethane functional group. $R^{alkyl}$ may be represented as —$C_xH_{2x}$—$X^4$—$C_yH_{2y}$—, where $X^4$ is selected from a covalent bond, or ether, ester, amide, urea, thioether or urethane functional group, and x and y are independently 2 to 10. When R* is $R^{alkyl}$, then $X^2$ is —O—, an ester group, a urea group or a urethane group may be represented by $X^{2\text{-}alkyl}$.

In many embodiments, the crosslinking monomer may be prepared by (meth)acrylation of an allyl-substituted phenol, such as by reacting a 2-, 3- or 4-allylphenol with (meth)acryloyl halide or a (meth)acrylate ester. Alternately an allyl-substituted aniline may be so (meth)acrylated, where $X^3$ is a leaving groups such as a halide, and $R^1$, $R^{Aryl}$, $X^1$ and $X^2$ are as previously defined. With respect to the reaction scheme, the allyl-substituted phenol may be an allylphenol ($X^2$ is a covalent bond) or an allyloxyphenol ($X^2$ is —O—).

In some embodiments, the HX-$R^{Aryl}$~portion of the reactant may comprise a hydroxyalkyl aromatic group, such a benzyl alcohol group, or a hydroxyalkyloxy aryl group, such as eugenyl ethanol. One skilled in the art will understand the compounds of Formula 1 may be prepared by formation of the $X^2$ group.

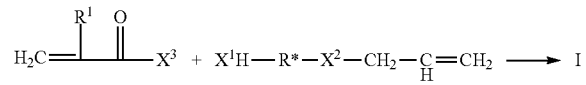

In some embodiments, the (meth)acrylic copolymers and syrup composition can be polymerized by various techniques including, but not limited to, solvent polymerization, dispersion polymerization, solventless bulk polymerization, and radiation polymerization, including processes using ultraviolet light, electron beam, and gamma radiation. The monomer mixture may comprise a polymerization initiator, especially a thermal initiator or a photoinitiator of a type and in an amount effective to polymerize the comonomers.

A typical solution polymerization method is carried out by adding the monomers, a suitable solvent, and an optional chain transfer agent to a reaction vessel, adding a free radical initiator, purging with nitrogen, and maintaining the reaction vessel at an elevated temperature (e.g. about 40 to 100° C.) until the reaction is complete, typically in about 1 to 20 hours, depending upon the batch size and temperature. Examples of typical solvents include methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

Useful initiators include those that, on exposure to heat or light, generate free-radicals that initiate (co)polymerization of the monomer mixture. The initiators are typically employed at concentrations ranging from about 0.0001 to about 3.0 parts by weight, preferably from about 0.001 to about 1.0 parts by weight, and more preferably from about 0.005 to about 0.5 parts by weight of the total monomer or polymerized units.

Suitable initiators include but are not limited to those selected from the group consisting of azo compounds such as VAZO 64 (2,2'-azobis(isobutyronitrile)), VAZO 52 (2,2'-azobis(2,4-dimethylpentanenitrile)), and VAZO 67 (2,2'-azobis-(2-methylbutyronitrile)) available from E.I. du Pont de Nemours Co., peroxides such as benzoyl peroxide and lauroyl peroxide, and mixtures thereof. The preferred oil-soluble thermal initiator is (2,2'-azobis-(2-methylbutyronitrile)). When used, initiators may comprise from about 0.05 to about 1 part by weight, preferably about 0.1 to about 0.5 part by weight based on 100 parts by weight of monomer components in the pressure sensitive adhesive.

The polymers prepared from solution polymerization have pendent allyl groups that can be crosslinked by a variety of methods. These include addition of thermal or photo initiators followed by heat or UV exposure after coating. The polymers may also be crosslinked by exposure to electron beam or gamma irradiation.

One preferred method of preparing (meth)acrylic polymers includes partially polymerizing monomers to produce a syrup composition comprising the solute (meth)acrylic polymer and unpolymerized solvent monomer(s). The unpolymerized solvent monomer(s) typically comprises the same monomer as utilized to produce the solute (meth)acrylic polymer. If some of the monomers were consumed during the polymerization of the (meth)acrylic polymer, the unpolymerized solvent monomer(s) comprises at least some of the same monomer(s) as utilized to produce the solute (meth)acrylic polymer. Further, the same monomer(s) or other monomer(s) can be added to the syrup once the (meth)acrylic polymer has been formed. Partial polymerization provides a coatable solution of the (meth)acrylic solute polymer in one or more free-radically polymerizable solvent monomers. The partially polymerized composition is then coated on a suitable substrate and further polymerized.

The resulting solute copolymers may be represented as

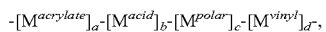

where
[$M^{acrylate}$] represents polymerized (meth)acrylate ester monomer units, and subscript a represents the parts by weight as described,
[$M^{acid}$] represents polymerized acid monomer units, and subscript b represents the parts by weight as described,
[$M^{polar}$]$_c$ represents polymerized polar monomer units, and subscript c represents the parts by weight as described, and
[$M^{vinyl}$]$_b$ represents polymerized vinyl monomer units, and subscript d represents the parts by weight as described.

In some embodiments, the crosslinking monomer is added to the monomer(s) utilized to form the (meth)acrylic polymer. Alternatively or in addition thereto, the crosslinking monomer may be added to the syrup after the (meth)acrylic polymer has been formed. One of the (meth)allyl groups of the crosslinker and other (e.g. (meth)acrylate) monomers utilized to form the (meth)acrylic polymer polymerize forming an acrylic backbone with the pendent (meth)allyl group. Without intending to be bound by theory, it is surmised that at least a portion of the carbon-carbon double bonds of the (meth)allyl group crosslink with each other during radiation curing of the syrup. Other reaction mechanisms may also occur.

The resulting solute copolymers may be represented as

where
[$M^{acrylate}$] represents polymerized (meth)acrylate ester monomer units, and subscript a represents the parts by weight as described,
[$M^{acid}$] represents polymerized acid monomer units, and subscript b represents the parts by weight as described,
[$M^{polar}$] represents polymerized polar monomer units, and subscript c represents the parts by weight as described, and
[$M^{vinyl}$] represents polymerized vinyl monomer units, and subscript d represents the parts by weight as described.
[$M^{xlink}$] represents polymerized crosslinker monomer units, and subscript e represents the parts by weight as described.

With regard to the above copolymer, the crosslinking monomer will selectively polymerize through the (meth)acrylate group providing the copolymer with pendent alkyl groups. Minor amount of copolymer polymerized through the allyl group may be present.

The syrup method provides advantages over solvent or solution polymerization methods; the syrup method yielding higher molecular weight materials. These higher molecular weights increase the amount of chain entanglements, thus increasing cohesive strength. Also, the distance between cross-links can be greater with high molecular syrup polymer, which allows for increased wet-out onto a surface.

Polymerization of the (meth)acrylate solvent monomers can be accomplished by exposing the syrup composition to energy in the presence of a photoinitiator. Energy activated initiators may be unnecessary where, for example, ionizing radiation is used to initiate polymerization. Typically, a photoinitiator can be employed in a concentration of at least 0.0001 parts by weight, preferably at least 0.001 parts by weight, and more preferably at least 0.005 parts by weight, relative to 100 parts by weight of the syrup.

A preferred method of preparation of the syrup composition is photoinitiated free radical polymerization. Advantages of the photopolymerization method are that 1) heating the monomer solution is unnecessary and 2) photoinitiation is stopped completely when the activating light source is turned off. Polymerization to achieve a coatable viscosity may be conducted such that the conversion of monomers to polymer is up to about 20%. Polymerization can be terminated when the desired conversion and viscosity have been achieved by removing the light source and by bubbling air (oxygen) into the solution to quench propagating free radicals. The solute polymer(s) may be prepared conventionally in a non-monomeric solvent and advanced to high conversion (degree of polymerization). When solvent (monomeric or non-monomeric) is used, the solvent may be removed (for example by vacuum distillation) either before or after formation of the syrup composition. While an acceptable method, this procedure involving a highly converted functional polymer is not preferred because an additional solvent removal step is required, another material may be required (a non-monomeric solvent), and dissolution of the high molecular weight, highly converted solute polymer in the monomer mixture may require a significant period of time.

The polymerization is preferably conducted in the absence of solvents such as ethyl acetate, toluene and tetrahydrofuran, which are non-reactive with the functional groups of the components of the syrup composition. Solvents influence the rate of incorporation of different monomers in the polymer chain and generally lead to lower molecular weights as the polymers gel or precipitate from solution. Thus, the (e.g. pressure sensitive) adhesive can be free of unpolymerizable organic solvent.

Useful photoinitiators include benzoin ethers such as benzoin methyl ether and benzoin isopropyl ether; substituted acetophenones such as 2,2-dimethoxy-2-phenylacetophenone photoinitiator, available the trade name IRGACURE 651 or ESACURE KB-1 photoinitiator (Sartomer Co., West Chester, Pa.), and dimethylhydroxyacetophenone; substituted α-ketols such as 2-methyl-2-hydroxy propiophenone; aromatic sulfonyl chlorides such as 2-naphthalenesulfonyl chloride; and photoactive oximes such as 1-phenyl-1,2-propanedione-2-(O-ethoxy-carbonyl)oxime. Particularly preferred among these are the substituted acetophenones.

Preferred photoinitiators are photoactive compounds that undergo a Norrish I cleavage to generate free radicals that can initiate by addition to the acrylic double bonds. The photoinitiator can be added to the mixture to be coated after the polymer has been formed, i.e., photoinitiator can be added to the syrup composition. Such polymerizable photoinitiators are described, for example, in U.S. Pat. Nos. 5,902,836 and 5,506,279 (Gaddam et al.).

Such photoinitiators preferably are present in an amount of from 0.1 to 1.0 parts by weight, relative to 100 parts by weight of the total syrup content. Accordingly, relatively thick coatings can be achieved when the extinction coefficient of the photoinitiator is low.

The syrup composition and the photoinitiator may be irradiated with activating UV radiation to polymerize the monomer component(s). UV light sources can be of two types: 1) relatively low light intensity sources such as blacklights, which provide generally 10 mW/cm² or less (as measured in accordance with procedures approved by the United States National Institute of Standards and Technology as, for example, with a UVIMAP UM 365 L-S radiometer manufactured by Electronic Instrumentation & Technology, Inc., in Sterling, Va.) over a wavelength range of 280 to 400 nanometers; and 2) relatively high light intensity sources such as medium pressure mercury lamps which provide intensities generally greater than 10 mW/cm², preferably 15 to 450 mW/cm². Where actinic radiation is used to fully or partially polymerize the syrup composition, high intensities and short exposure times are preferred. For example, an intensity of 600 mW/cm² and an exposure time of about 1 second may be used successfully. Intensities can range from 0.1 to 150 mW/cm², preferably from 0.5 to 100 mW/cm², and more preferably from 0.5 to 50 mW/cm².

The degree of conversion can be monitored during the irradiation by measuring the index of refraction of the polymerizing medium as previously described. Useful coating viscosities are achieved with conversions (i.e., the percentage of available monomer polymerized) in the range of up to 30%, preferably 2% to 20%, more preferably from 5% to 15%, and most preferably from 7% to 12%. The molecular weight (weight average) of the solute polymer(s) is typically at least 100,000; 250,000; 500,000 g/mole or greater.

When preparing (meth)acrylic polymers described herein, it is expedient for the photoinitiated polymerization reactions to proceed to virtual completion, i.e., depletion of the monomeric components, at temperatures less than 70° C. (preferably at 50° C. or less) with reaction times less than 24 hours, preferably less than 12 hours, and more preferably less than 6 hours. These temperature ranges and reaction rates obviate the need for free radical polymerization inhibitors, which are often added to acrylic systems to stabilize against undesired, premature polymerization and gelation. Furthermore, the addition of inhibitors adds extraneous material that will remain with the system and inhibit the desired polymerization of the syrup composition and formation of the crosslinked pressure-sensitive adhesives. Free radical polymerization inhibitors are often required at processing temperatures of 70° C. and higher for reaction periods of more than 6 to 10 hours.

The copolymer resulting from the polymerization of the monomers has the general formula $\sim[M^{acrylate}]_m\text{-}[M^{acid}]_n\text{-}[M^{polar}]_o\text{-}[M^{vinyl}]_p[M^{xlink}]_q\sim$, where $[M^{acrylate}]$ represents polymerized acrylate ester monomer units, where subscript m corresponds to the parts by weight thereof;

$[M^{acid}]$ represents polymerized acid monomer units, where subscript n corresponds to the parts by weight thereof;

$[M^{polar}]$- represents polymerized non-acid functional polar monomer units, where subscript o corresponds to the parts by weight thereof;

$[M^{vinyl}]$ represents polymerized vinyl monomer units, where subscript p corresponds to the parts by weight thereof; and $[M^{xlink}]$ represents polymerized crosslinker monomer units, where subscript q corresponds to the parts by weight thereof. It will be understood that the crosslinker may be partially incorporated into the copolymer and have a free, pendent vinyl group, or may be crosslinked to another copolymer chain.

The pressure sensitive adhesives may optionally contain one or more conventional additives. Preferred additives include tackifiers, plasticizers, dyes, antioxidants, UV stabilizers, and (e.g. inorganic) fillers such as (e.g. fumed) silica and glass bubbles.

In some embodiments, the pressure sensitive adhesive comprises fumed silica. Fumed silica, also known as pyrogenic silica, is made from flame pyrolysis of silicon tetrachloride or from quartz sand vaporized in a 3000° C. electric arc. Fumed silica consists of microscopic droplets of amorphous silica fused into (e.g. branched) three-dimensional primary particles that aggregate into larger particles. Since the aggregates do not typically break down, the average particle size of fumed silica is the average particle size of the aggregates. Fumed silica is commercially available from various global producers including Evonik, under the trade designation "Aerosil"; Cabot under the trade designation "Cab-O-Sil", and Wacker Chemie-Dow Corning. The BET surface area (Brunauer-Emmett-Teller) of suitable fumed silica is typically at least 50 $m^2/g$, or 75 $m^2/g$, or 100 $m^2/g$. In some embodiments, the BET surface area of the fumed silica is no greater than 400 $m^2/g$, or 350 $m^2/g$, or 300 $m^2/g$, or 275 $m^2/g$, or 250 $m^2/g$. The fumed silica aggregates preferably comprise silica having a primary particle size no greater than 20 nm or 15 nm. The aggregate particle size is substantially larger than the primary particle size and is typically at least 100 nm or greater.

The concentration of (e.g. fumed) silica can vary. In some embodiments, such as for conformable pressure sensitive adhesives, the adhesive comprises at least 0.5, 1.0, 1.1, 1.2, 1.3, 1.4, or 1.5 wt-% of (e.g. fumed) silica and in some embodiments no greater than 5, 4, 3, or 2 wt-%. In other embodiments, the adhesive comprises at least 5, 6, 7, 8, 9, or 10 wt-% of (e.g. fumed) silica and typically no greater than 20, 19, 18, 17, 16, or 15 wt-% of (e.g. fumed) silica.

In some embodiments, the pressure sensitive adhesive comprises glass bubbles. Suitable glass bubbles generally have a density ranging from about 0.125 to about 0.35 g/cc. In some embodiments, the glass bubbles have a density less than 0.30, 0.25, or 0.20 g/cc. Glass bubbles generally have a distribution of particles sizes. In typical embodiments, 90% of the glass bubbles have a particle size (by volume) of at least 75 microns and no greater than 115 microns. In some embodiments, 90% of the glass bubbles have a particle size (by volume) of at least 80, 85, 90, or 95 microns. In some embodiments, the glass bubbles have a crush strength of at least 250 psi and no greater than 1000, 750, or 500 psi. Glass bubbles are commercially available from various sources including 3M, St. Paul, Minn.

The concentration of glass bubbles can vary. In some embodiments, the adhesive comprises at least 1, 2, 3, 4 or 5 wt-% of glass bubbles and typically no greater than 20, 15, or 10 wt-% of glass bubbles.

The inclusion of glass bubbles can reduce the density of the adhesive. Another way of reducing the density of the adhesive is by incorporation of air or other gasses into the adhesive composition. For example the (e.g. syrup) adhesive composition can be transferred to a froather as described for examples in U.S. Pat. No. 4,415,615; incorporated herein by reference. While feeding nitrogen gas into the frother, the frothed syrup can be delivered to the nip of a roll coater between a pair of transparent, (e.g. biaxially-oriented polyethylene terephthalate) films. A silicone or fluorochemical surfactant is included in the froathed syrup. Various surfactants are known including copolymer surfactants described in U.S. Pat. No. 6,852,781.

In some embodiments no tackifier is used. When tackifiers are used, the concentration can range from 5 or 10 wt-% to 40, 45, 50, 55, or 60 wt-% of the (e.g. cured) adhesive composition.

Various types of tackifiers include phenol modified terpenes and rosin esters such as glycerol esters of rosin and pentaerythritol esters of rosin that are available under the trade designations "Nuroz", "Nutac" (Newport Industries), "Permalyn", "Staybelite", "Foral" (Eastman). Also available are hydrocarbon resin tackifiers that typically come from C5 and C9 monomers by products of naphtha cracking and are available under the trade names "Piccotac", "Eastotac", "Regalrez", "Regalite" (Eastman), "Arkon" (Arakawa), "Norsolene", "Wingtack" (Cray Valley), "Nevtack", LX (Neville Chemical Co.), "Hikotac", "Hikorez" (Kolon Chemical), "Novares" (Rutgers Nev.), "Quintone" (Zeon), "Escorez" (Exxonmobile Chemical), "Nures", and "H-Rez" (Newport Industries). Of these, glycerol esters of rosin and pentaerythritol esters of rosin, such as available under the trade designations "Nuroz", "Nutac", and "Foral" are considered biobased materials.

Depending on the kinds and amount of components, the pressure sensitive adhesive can be formulated to have a wide variety of properties for various end uses.

The adhesives of the present invention may be coated upon a variety of flexible and inflexible backing materials using conventional coating techniques to produce adhesive-coated materials. Flexible substrates are defined herein as any material which is conventionally utilized as a tape backing or may be of any other flexible material. Examples include, but are not limited to plastic films such as polypropylene, polyethylene, polyvinyl chloride, polyester (polyethylene terephthalate), polycarbonate, polymethyl(meth)acrylate (PMMA), cellulose acetate, cellulose triacetate, and ethyl cellulose. Foam backings may be used. In some embodiments, the backing is comprised of a bio-based material such as polylactic acid (PLA).

The adhesive can also be provided in the form of a pressure-sensitive adhesive transfer tape in which at least one layer of the adhesive is disposed on a release liner for application to a permanent substrate at a later time. The adhesive can also be provided as a single coated or double coated tape in which the adhesive is disposed on a permanent backing.

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metalized polymer films, or ceramic sheet materials may take the form of any article conventionally known to be utilized with pressure-sensitive adhesive compositions such as labels, tapes, signs, covers, marking indicia, and the like.

Backings can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Foams are commercially available from various suppliers such as 3M Co., Voltek, Sekisui, and others. The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings. Such treatments are typically selected based on the nature of the materials of the adhesive and of the foam or backing and include primers and surface modifications (e.g., corona treatment, surface abrasion). Suitable primers include for example those described in EP 372756, U.S. Pat. Nos. 5,534,391, 6,893,731, WO2011/068754, and WO2011/38448.

In some embodiments, the backing material is a transparent film having a transmission of visible light of at least 90 percent. The transparent film may further comprise a graphic. In this embodiment, the adhesive may also be transparent.

The above-described compositions can be coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. The composition may also be coated from the melt. These various methods of coating allow the compositions to be placed on the substrate at variable thicknesses thus allowing a wider range of use of the compositions. Coating thicknesses may vary as previously described. The syrup composition may be of any desirable concentration for subsequent coating, but is typically 5 to 20 wt-% polymer solids in monomer. The desired concentration may be achieved by further dilution of the coating composition, or by partial drying. Coating thicknesses may vary from about 25 to 1500 microns (dry thickness). In typical embodiments, the coating thickness ranges from about 50 to 250 microns. When the multilayer PSA or article is intended to be bonded to a rough surface, the thickness of the adhesive layer typically ranges from the average roughness (Ra) to slightly greater than the maximum peak height (Rt).

For a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, another layer of adhesive is disposed on the backing surface opposite that where the adhesive of the invention is disposed. The other layer of adhesive can be different from the adhesive of the invention, e.g., a conventional acrylic PSA, or it can be the same adhesive as the invention, with the same or a different formulation. Double coated tapes are typically carried on a release liner. Additional tape constructions include those described in U.S. Pat. No. 5,602,221 (Bennett et al.), incorporated herein by reference.

EXAMPLES

Unless otherwise indicated, reagents were available from Sigma-Aldrich (St. Louis, Mo.).

TABLE 1

Glossary of Materials.

| Material | Description |
|---|---|
| 2-Octyl acrylate (2OA) | Prepared according to Preparatory Example 1 of U.S. Pat. No. 7,385,020. |
| Acrylic acid (AA) | Available from BASF Corporation (Florham Park, NJ, USA) |
| IRGACURE 651 (651) | Available from BASF Corporation (Florham Park, NJ, USA) |
| 4-Acryloyxybenzoic acid allyl ester (ABAE) 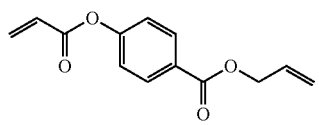 | Can be prepared according to Synthesis of Exemplified Compound M-1 of U.S. Pat. No. 8,282,872. |

TABLE 1-continued

Glossary of Materials.

| Material | Description |
|---|---|
| 1,6-hexanediol diacrylate (HDDA) | Available from Sigma-Aldrich Co. LLC (St. Louis, MO, USA) |

Test Methods

Test Method 1: Shear Strength Test

Stainless steel (SS) plates were prepared for testing by cleaning with methyl ethyl ketone and a clean KIMWIPE tissue (Kimberly-Clark, Dallas, Tex.) three times. The adhesive films described were cut into strips (1.27 cm in width) and adhered by their adhesive to flat, rigid stainless steel plates with a 2.54 cm length of each adhesive film strip in contact with the plate to which it was adhered. A weight of 2 kilograms (4.5 pounds) was rolled over the adhered portion. Each of the resulting plates with the adhered film strip was equilibrated at room temperature for 15 minutes. Afterwards, the samples was transferred to a 70° C. oven, in which a 500 g weight was hung from the free end of the adhered film strip with the panel tilted 2° from the vertical to ensure against any peeling forces. The time (in minutes) at which the weight fell, as a result of the adhesive film strip releasing from the plate, was recorded. The test was discontinued at 10,000 minutes if there was no failure. In Table 2, this is designated as 10,000+ minutes. Two specimens of each tape (adhesive film strip) were tested and the shear strength tests were averaged to obtain the reported shear values.

Test Method 2: 180° Peel Adhesion Test

Peel adhesion was the force required to remove an adhesive-coated test specimen from a test panel measured at a specific angle and rate of removal. In the Examples, this force is expressed in ounces per inch width of coated sheet and the results are normalized to N/dm. The following procedure was used:

Peel adhesion strength was measured at a 180° peel angle using an IMASS SP-200 slip/peel tester (available from IMASS, Inc., Accord, Mass.) at a peel rate of 305 mm/minute (12 inches/minute). Stainless steel (SS) test panels were prepared as described above. The cleaned panel was allowed to dry at room temperature. An adhesive coated film was cut into tapes measuring 1.27 cm×20 cm (½ in.×8 in.). A test sample was prepared by rolling the tape down onto a cleaned panel with 2 passes of a 2.0 kg (4.5 lb.) rubber roller. The prepared samples were dwelled at 23° C./50% relative humidity (RH) for 15 minutes before testing. Four samples were tested for each example. The resulting peel adhesion was converted from ounces/0.5 inch to ounces/inch (N/dm), with both values being reported.

Preparatory Example 1: Synthesis of 4-Allyloxybenzyl Acrylate (AOBA)

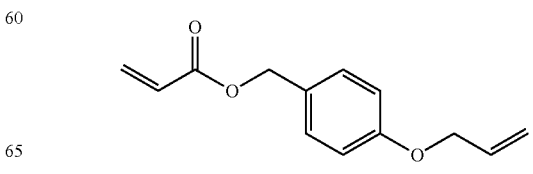

A mixture of 4-allyloxybenzaldehyde (40.37 g, 0.25 mol, Alfa Aesar, Ward Hill, Mass.) and methanol (150 mL) was cooled in a cold water bath. Sodium borohydride (13.20 g, 0.35 mmol, Alfa Aesar) was added portionwise over 1 hour. The mixture was stirred for 1 hour, then concentrated under vacuum. Ethyl acetate (200 mL) was added and the mixture was washed with 1.0 M HCl solution and water. The solvent was removed under vacuum to provide a crude oil that was purified by vacuum distillation. A colorless oil (25.74 g of 4-allyloxybenzyl alcohol) was collected at 95-100° C. at 0.3 mm Hg.

A mixture of 4-allyloxybenzyl alcohol (15.00 g, 91 mmol), methylene chloride (100 mL), and triethylamine (9.24 g, 91 mmol) was cooled in an ice bath. Acryloyl chloride (9.88 g, 0.11 mol) was added dropwise over 1 hour. The mixture was stirred for 17 hours at room temperature, then was filtered. Heptane (50 mL) was added to the filtrate and the mixture was filtered. The solution was concentrated under vacuum. Ethyl acetate (150 mL) was added and the mixture was washed with 1.0 M HCl solution, then with saturated aqueous sodium bicarbonate, and then was dried over magnesium sulfate. The solvent was removed under vacuum to provide a yellow oil (15.64 g of 4-allyloxybenzyl acrylate).

Preparatory Example 2: Synthesis of 2-Allylphenyl Acrylate (APA)

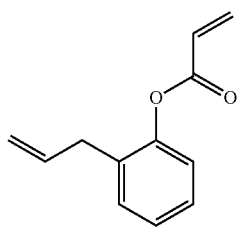

A mixture of 2-allylphenol (30.00 g, 0.22 mol; Sigma-Aldrich), methylene chloride (150 mL), and triethylamine (22.62 g, 0.22 mol) was cooled in an ice bath. Acryloyl chloride (24.44 g, 0.27 mol) was added dropwise over 1 hour. The mixture was stirred for 3 hours at room temperature, then filtered. The solution was concentrated under vacuum. Ethyl acetate (200 mL) was added and the mixture was washed with 1.0 M HCl solution and saturated aqueous sodium bicarbonate, then dried over magnesium sulfate. The solvent was removed under vacuum to provide a crude oil that was purified by vacuum distillation. A colorless oil (35.59 g of 2-allylphenyl acrylate) was collected at 68-70° C. at 0.3 mm Hg.

Preparatory Example 3: Synthesis of Ethoxy Eugenyl Acrylate (EEA)

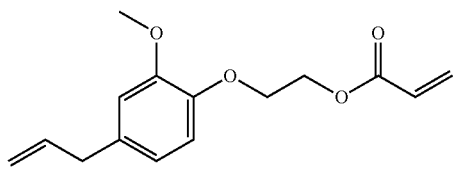 [SMILES: C=CCc1ccc(OCCOC(=O)C=C)c(OC)c1]

Eugenol (82.10 g, 0.50 mol, Alfa Aesar) and 2-bromoethanol (156.20 g, 1.25 mol) were combined in a round bottom flask with stirring. A solution of potassium hydroxide (84.17 g, 1.50 mol) in ethanol (500 mL) and water (20 mL) was slowly added to the flask. The solution was heated to reflux for 19 hours, then cooled to room temperature. The mixture was extracted with ethyl acetate twice, and the combined organic layers were dried over magnesium sulfate and concentrated under vacuum. Crude product was concentrated under vacuum to give a yellow oil (2-eugenyl ethanol, 110 g) which was used for the next step without further purification.

2-Eugenyl ethanol (41.65 g, 0.20 mol) and triethylamine (20.31 mL, 0.20 mol) were dissolved in diethyl ether (74 mL) under a nitrogen atmosphere. Acryloyl chloride (22.63 g, 0.25 mol) was added dropwise to the solution. The reaction was allowed to stir at room temperature for 60 hours, then filtered. The crude product mixture was washed with a 5% NaOH solution followed by water. The organic layer was dried over $MgSO_4$ and concentrated under vacuum. The crude product was purified by column chromatography over silica gel using ethyl acetate/hexane (90/10) as an eluent to give the product (28.60 g, ethoxy eugenyl acrylate) as a colorless oil.

Preparatory Example 4: Eugenyl Acrylate (EgA)

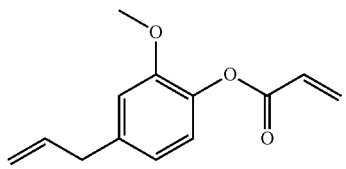 [SMILES: C=CCc1ccc(OC(=O)C=C)c(OC)c1]

A mixture of eugenol (87.57 g, 0.54 mol), methylene chloride (300 mL), and triethylamine (53.96 g, 0.53 mol) was cooled in an ice bath. Acryloyl chloride (50.72 g, 0.56 mol) was added dropwise over 1 hour. The mixture was stirred for 5 hours at room temperature, then filtered. The solution was concentrated under vacuum. Ethyl acetate (300 mL) was added and the mixture was washed with 1.0 M HCl solution and saturated aqueous sodium bicarbonate, then dried over magnesium sulfate. The solvent was removed under vacuum to provide a crude oil that was purified by vacuum distillation. A colorless oil (98.21 g of eugenyl acrylate) was collected at 85-95° C. at 0.1 mm Hg.

Preparatory Example 5: Synthesis of Acroyloxymethyl Styrene (AMS)

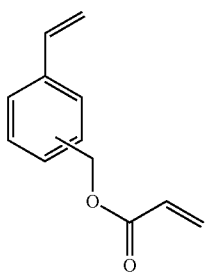

A mixture of acrylic acid (17.87 g, 0.25 mol) N,N-dimethylformate (110 mL), and potassium carbonate (20.49 g, 0.15 mol) was stirred for 10 minutes. Vinyl benzyl chloride (34.39 g, 0.23 mol, Sigma-Aldrich (a mixture of 3-vinyl and 4-vinyl isomers)) was added slowly over 10 minutes. The mixture was then stirred at 85° C. After one hour, potassium carbonate was added (7.55 g, 0.06 mol). After a total of 3 hours, the mixture was cooled to room temperature. Water (300 mL) was added and the mixture was extracted two times with heptane (300 mL). The combined organic phases were washed with brine and dried over magnesium sulfate. The solvent was removed under vacuum to provide a crude oil that was purified by vacuum distillation. A colorless oil (36.12 g of acroyloxymethyl styrene) was collected at 91-96° C. at 0.3 mm Hg.

Preparatory Example 6: Synthesis of 2-Allyloxyethyl Acrylate (AOEA)

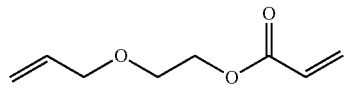

A mixture of 2-allyloxy ethanol (30.00 g, 0.29 mol, TCI), methylene chloride (200 mL), and triethylamine (33.39 g, 0.33 mol) was cooled in an ice bath. Acryloyl chloride (29.87 g, 0.33 mol) was added dropwise over 1 hour. The mixture was stirred for 2 hours at room temperature, then filtered. The solution was concentrated under vacuum. Ethyl acetate (200 mL) was added and the mixture was washed with 1.0 M HCl solution and saturated aqueous sodium bicarbonate, then dried over magnesium sulfate. The solvent was removed under vacuum to provide a crude oil that was purified by vacuum distillation. A colorless oil (35.19 g of 2-allyloxyethyl acrylate) was collected at 57-60° C. at 5.0 mm Hg.

Preparatory Example 7: Synthesis of Allyl N-2-(Propenoic Acid Ethyl Ester) Carbamate (AAC)

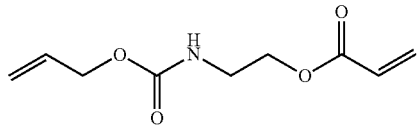

A mixture of allyl alcohol (4.12 g, 71 mmol), KARENZ AOI (2-isocyanatoethyl acrylate, 10.00 g, 71 mmol, Showa Denko, Japan), acetone (20.00 g), and dibutyltin dilaurate (30 mg) was shaken at room temperature for 6 hours. The solvent was then removed under vacuum to give a colorless oil (Allyl N-2-(2-propenoic acid ethyl ester) carbamate).

Preparatory Example 8: Synthesis of 2-Allyloxy N-2-(2-Propenoic Acid Ethyl Ester) Carbamate (AOC)

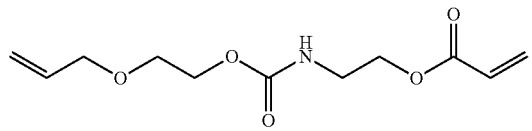 [SMILES: C=CCOCCOC(=O)NCCOC(=O)C=C]

A mixture of 2-allyloxyethanol (7.24 g, 71 mmol), KARENZ AOI (2-isocyanatoethyl acrylate, 10.00 g, 71 mmol, Showa Denko, Japan), acetone (20.00 g), and dibutyltin dilaurate (30 mg) was shaken at room temperature for 6 hours. The solvent was then removed under vacuum to give a colorless oil (2-allyloxy N-2-(2-propenoic acid ethyl ester) carbamate).

Examples 1-16 and Comparative Example 1

Adhesive compositions were prepared by charging an 8 ounce (~237 mL) jar with 45 g of 2OA, 5 g of AA, 0.02 g of IRGACURE 651 and the amounts and type of monofunctional acrylates (from preparatory examples) as shown in Table 2. The monomer mixture was purged with nitrogen for 2 minutes then exposed to "UV A" light from a low intensity black bulb (15 watt, 350 nm peak) until the viscosity increased and a coatable syrup was prepared.

An additional 0.08 g (0.16 phr) of IRGACURE 651 was then mixed into the syrup. The compositions were then knife-coated between clear release liners at a 5 mil (127 micrometers) thickness and cured by exposure to "UV A" light from 350 BL light bulbs (40 watt, Osram Sylvania) as shown in Table 2 over 10 minutes. Total UV exposure was measured with an UVIRAD LOW ENERGY UV INTEGRATING RADIOMETER (EIT, Inc., Sterling, Va.). Tapes were laminated to PET and tested for shear and peel adhesion according to test methods 1 and 2. Results were as shown in Table 2.

Comparative Example 2 was made in the fashion as Examples 1-16 except that HDDA was used instead of a monofunctional acrylate.

Comparative Examples C3-C4

Compositions were prepared by charging a 500 mL jar with 270 g (90 wt. %) 2-octyl acrylate (2OA), 30 g (10 wt. %) of acrylic acid (AA), and 0.12 g (0.04 phr) of photoinitiator 1 (2,2-dimethoxy-2-phenylacetophenone, Irgacure™ 651). The monomer mixture was purged with nitrogen for 10 minutes then exposed to low intensity UV A light (less than 10 mW/cm², referred to as UV A because their output is primarily between 320 and 390 nm with a peak emission at around 350 nm which is in the UV A spectral region) until a coatable prepolymer syrup (Brookfield viscosity of 100-8000 cP) was formed, after which an additional 0.48 g (0.16 phr) of photoinitiator 1 and a quantity of HDDA according to Table 2 was mixed into the composition.

The pre-adhesive (i.e. syrup) compositions were then coated on a release liner at a thickness of about 5 mil (127 micrometers) and cured under a nitrogen atmosphere by further exposure to UVA light from 350 BL light bulbs (40 watt, Osram Sylvania) as shown in Table 2 for various times to form a pressure sensitive adhesive (PSA). Total energies were measured using a Powermap™ radiometer equipped with a low intensity sensing head (available from EIT Inc., Sterling, Va.). The PSA was then laminated to a primed 2 mil poly(ethylene terpthalate) backing (trade designation Hostaphan 3 SAB PET film; Mitsubishi) to form a tape for adhesive testing. Results are shown in Table 2.

TABLE 2

Adhesive Properties of Examples 1-16 and Comparatives Example 1-4

| Ex | Crosslinker Material | phr | (g) | Total UV-A Exposure mJ/cm$^2$ | 70° C. Shear (min) | 180° Peel Adhesion to SS (oz/in, N/dm) |
|---|---|---|---|---|---|---|
| 1 | AOBA | 0.5 | 0.25 | 2102 | 10,000+ | 72.7, 79.6 |
| 2 | AOBA | 1.0 | 0.5 | 2102 | 10,000+ | 64.2, 70.3 |
| 3 | ABAE | 0.5 | 0.25 | 2102 | 10,000+ | 75.8, 83.0 |
| 4 | ABAE | 1.0 | 0.5 | 2102 | 10,000+ | 66.8, 73.1 |
| 5 | APA | 0.5 | 0.25 | 2102 | 10,000+ | 86.1, 94.2 |
| 6 | APA | 1.0 | 0.5 | 2102 | 10,000+ | 80.4, 88.0 |
| 7 | EEA | 0.5 | 0.25 | 1925 | 10,000+ | 71.9, 78.7 |
| 8 | EEA | 1.0 | 0.5 | 1925 | 10,000+ | 68.3, 74.8 |
| 9 | EA | 0.5 | 0.25 | 1636 | 10,000+ | 70.1, 76.7 |
| 10 | EA | 1.0 | 0.5 | 1636 | 10,000+ | 76.7, 84.1 |
| 11 | AOEA | 0.5 | 0.25 | 1934 | 10,000+ | 91.4, 100.0 |
| 12 | AOEA | 1.0 | 0.5 | 1934 | 10,000+ | 63.6, 69.6 |
| 13 | AAC | 0.5 | 0.25 | 1697 | 10,000+ | 82.1, 89.9 |
| 14 | AAC | 1.0 | 0.5 | 1697 | 10,000+ | 61.6, 67.4 |
| 15 | AOC | 0.5 | 0.25 | 1697 | 10,000+ | 65.7, 71.9 |
| 16 | AOC | 1.0 | 0.5 | 1697 | 10,000+ | 70.3, 76.9 |
| C1 | AMS* | 0.5 | 0.25 | N/A | N/A | N/A |
| C2 | HDDA | 0.2 | 0.1 | N/A | N/A | N/A |
| C3 | HDDA | 0.1 | 0.3 | 1016 | 3432 | 41.3, 45.2 |
| C4 | HDDA | 0.2 | 0.6 | 1016 | 5890 | 17.2, 18.8 |

*Sample gelled upon formation of the prepolymer syrup and therefore, no PSA was made.

This disclosure provides the following illustrative embodiments:

1. A crosslinkable composition comprising an allyl-functional (meth)acrylate copolymer and a crosslinking monomer of the formula:

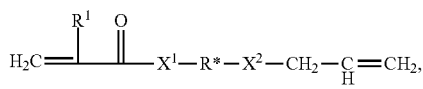

wherein
R$^1$ is H or CH$_3$,
X$^1$ is —O— or —NR$^1$—,
R* comprises an arylene group or an alkylene group, said alkylene group optionally substituted by an in-chain ether, ester, amide, urea, thioether or urethane functional group,
X$^2$ is a covalent bond, an ether group, an ester group, a urea group or a urethane group when R* is an arylene group, and X$^2$ is an ether group, an ester group, a urea group or a urethane group when R* is an alkylene group.

2. The crosslinkable composition of embodiment 1 where R* is an arylene group R$^{aryl}$ and X$^2$ is a covalent bond, an ether group, an ester group, a urea group or a urethane group.

3. The crosslinkable composition of embodiment 1 where R* is an alkylene group R$^{alkyl}$ said alkylene group optionally substituted by an in-chain ether, ester, amide, urea, thioether or urethane functional group and X$^2$ is an ether group, an ester group, a urea group or a urethane group.

4. The crosslinkable composition of embodiment 3 where R$^{alkyl}$ is of the formula: —C$_x$H$_{2x}$—X$^4$—C$_y$H$_{2y}$—, where X$^4$ is selected from a covalent bond, or ether, ester, amide, urea, thioether or urethane functional group, and x and y are independently 2 to 10.

5. The crosslinkable composition of any of the previous embodiments wherein the allyl-functional (meth)acrylate copolymer comprises interpolymerized monomer units of:
   i. 80 to 99 parts by weight of an (meth)acrylic acid ester monomer;
   ii. 1 to 15 parts by weight of an acid functional ethylenically unsaturated monomer;
   iii. 0 to 20 parts by weight of a non-acid functional, ethylenically unsaturated polar monomer;
   iv. 0 to 5 parts vinyl monomer; and
   v. 0.1 to 5 parts of a interpolymerized monomer units of the crosslinking agent;
   based on 100 parts by weight total monomer.

6. The polymer composition of any of the previous embodiments comprising 0.5 to 10 parts by weight of acid functional monomers.

7. The polymer composition of any of the previous embodiments comprising 0.5 to 5 parts by weight of a non-acid functional, ethylenically unsaturated polar monomers.

8. The crosslinkable composition of embodiment 6 wherein the acid functional monomer is selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropane sulfonic acid, vinyl phosphonic acid, and mixtures thereof 9. The crosslinkable composition of any of the previous embodiments comprising 90 to 95 parts by weight of units of (meth)acrylic acid ester monomers.

10. The crosslinkable composition of embodiment 7 wherein said non-acid functional, ethylenically unsaturated polar monomer is selected from 2-hydroxyethyl (meth)acrylate; N-vinylpyrrolidone; N-vinylcaprolactam; acrylamide; t-butyl acrylamide; dimethylamino ethyl acrylamide; N-octyl acrylamide; poly(alkoxyalkyl) (meth)acrylates; poly(vinyl methyl ether); and mixtures thereof.

11. The crosslinkable composition of any of the previous embodiments wherein said copolymer comprises 0.5 to 5 parts by weight of acrylic acid and 1 to 5 parts by weight of a non-acid functional, ethylenically unsaturated polar monomers.

12. The crosslinkable composition of any of the previous embodiments comprising 1 to 5 parts of a vinyl monomer selected from vinyl esters, styrene, substituted styrene, vinyl halide, vinyl propionate, and mixtures thereof 13. A syrup polymer composition comprising
   i) a solute (meth)acrylic polymer component comprising polymerized units derived from one or more alkyl (meth)acrylate monomers
   ii) a free-radically polymerizable solvent monomer component; and wherein the syrup comprises at least one crosslinking monomer and/or the (meth)acrylic solute polymer comprises polymerized units derived from at least one crosslinking monomer of the of the formula:

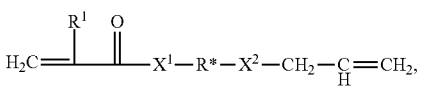

wherein
R$^1$ is H or CH$_3$,
X$^1$ is —O— or —NR$^1$—,
R* comprises an arylene group or an alkylene group, said alkylene group optionally substituted by an in-chain ether, ester, amide, urea, thioether or urethane functional group,
X$^2$ is a covalent bond, an ether group, an ester group, a urea group or a urethane group when R* is an arylene group, and X$^2$ is an ether group, an ester group, a urea group or a urethane group when R* is an alkylene group.

14. The syrup polymer composition of embodiment 13 comprising:
    a) first component solute copolymer comprising:
       i. 80 to 99.5 parts by weight of an (meth)acrylic acid ester;
       ii. 0.5 to 15 parts by weight of an acid functional monomer;
       iii. 0 to 20 parts by weight of a non-acid functional, ethylenically unsaturated polar monomer;
       iv. 0 to 5 parts vinyl monomer,
       v. 0 to 5 parts of a interpolymerized monomer units of the crosslinking agent, and
    b) a second component comprising at least one free-radically polymerizable solvent monomer and optional crosslinking agent, and
    c) wherein the solute copolymer and/or the solvent monomer component comprises a total of 0.005 to 5.0 parts by weight of the crosslinking monomer relative to 100 parts by weight of solute copolymer plus solvent monomer.

15. The syrup polymer composition of any of embodiments 13-14 wherein the syrup is free of polymerizable solvent.

16. A method of preparing a pressure sensitive adhesive composition comprising:
    a) providing a syrup according to any of embodiments 13 to 15;
    b) applying the syrup to a substrate; and
    c) irradiating the applied syrup thereby crosslinking the adhesive composition.

17. A polymerizable solution comprising:
    i. 80 to 99.5 parts by weight of an (meth)acrylic acid ester;
    ii. 0.5 to 15 parts by weight of an acid functional monomer;
    iii. 0 to 20 parts by weight of a non-acid functional, ethylenically unsaturated polar monomer;
    iv. 0 to 5 parts vinyl monomer,
    v. 0.1 to 5 parts of a crosslinking monomer of the formula:

$$H_2C=\underset{R^1}{\overset{}{C}}-\underset{O}{\overset{\|}{C}}-X^1-R^*-X^2-CH_2-\underset{H}{\overset{}{C}}=CH_2,$$

wherein
R$^1$ is H or CH$_3$,
X$^1$ is —O— or —NR$^1$—,
R* comprises an arylene group or an alkylene group, said alkylene group optionally substituted by an in-chain ether, ester, amide, urea, thioether or urethane functional group,
X$^2$ is a covalent bond, an ether group, an ester group, a urea group or a urethane group when R* is an arylene group, and X$^2$ is an ether group, an ester group, a urea group or a urethane group when R* is an alkylene group.

18. A crosslinkable composition comprising an allyl-functional (meth)acrylate copolymer and a crosslinking monomer of the formula:

$$H_2C=\underset{R^1}{\overset{}{C}}-\underset{O}{\overset{\|}{C}}-X^1-R^*-X^2-CH_2-\underset{H}{\overset{}{C}}=CH_2,$$

wherein
R$^1$ is H or CH$_3$,
X$^1$ is —O— or —NR$^1$—,
R* comprises an arylene group or an alkylene group, said alkylene optionally substituted by an in-chain ether, ester, amide, urea, thioether or urethane functional group,
X$^2$ is a covalent bond, an ether group, an ester group, a urea group or a urethane group when R* is an arylene group, and X$^2$ is an ether group, an ester group, a urea group or a urethane group when R* is an alkylene group.

19. A pressure-sensitive adhesive composition comprising a (meth)acrylate copolymer crosslinked by a crosslinking monomer of the formula:

$$H_2C=\underset{R^1}{\overset{}{C}}-\underset{O}{\overset{\|}{C}}-X^1-R^*-X^2-CH_2-\underset{H}{\overset{}{C}}=CH_2,$$

wherein
R$^1$ is H or CH$_3$,
X$^1$ is —O— or —NR$^1$—,
R* comprises an arylene group or an alkylene group, said alkylene group optionally substituted by an in-chain ether, ester, amide, urea, thioether or urethane functional group,
X$^2$ is a covalent bond, an ether group, an ester group, a urea group or a urethane group when R* is an arylene group, and X$^2$ is an ether group, an ester group, a urea group or a urethane group when R* is an alkylene group.

20. The pressure sensitive adhesive composition of embodiment 19 wherein the copolymer is of the formula:

$$\sim[M^{acrylate}]_m\text{-}[M^{acid}]_n\text{-}[M^{polar}]_o\text{-}[M^{vinyl}]_p[M^{xlink}]_q\sim,$$

where
[$M^{acrylate}$] represents polymerized acrylate ester monomer units, where subscript m corresponds to 85 to 99.5 parts s by weight thereof;
[$M^{acid}$] represents polymerized acid monomer units, where subscript n corresponds to 0.5 to 15 parts by weight thereof;
[$M^{polar}$]- represents polymerized non-acid functional polar monomer units, where subscript o corresponds to 0 to 20 parts by weight thereof;
[$M^{vinyl}$] represents polymerized other monomer units, where subscript p corresponds to 0 to 5 parts by weight thereof; wherein the sum of n, m, o and p is 100 parts by weight; and
[$M^{xlink}$] represents polymerized allyl crosslinker monomer units, where subscript q is 0.1 to 10 parts, relative to 100 parts by weight of the sum of n, m, o and p, said [M$^{xlink}$] derived from a crosslinking monomer of the formula:

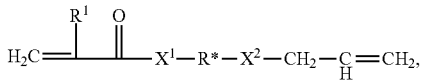

wherein
R$^1$ is H or CH$_3$,
X$^1$ is —O— or —NR$^1$—,
R* comprises an arylene group or an alkylene group, said alkylene group optionally substituted by an in-chain ether, ester, amide, urea, thioether or urethane functional group,
X$^2$ is a covalent bond, an ether group, an ester group, a urea group or a urethane group when R* is an arylene group, and X$^2$ is an ether group, an ester group, a urea group or a urethane group when R* is an alkylene group.

What is claimed is:

1. A crosslinkable composition comprising an allyl-functional (meth)acrylate copolymer and a crosslinking monomer of the formula:

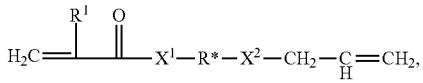

wherein
R$^1$ is H or CH$_3$,
X$^1$ is —O— or —NR$^1$—,
R* is an arylene group R$^{aryl}$, and
X$^2$ is a covalent bond, an ether group, an ester group, a urea group or a urethane group.

2. The crosslinkable composition of claim 1 wherein the allyl-functional (meth)acrylate copolymer comprises interpolymerized monomer units comprising:
 i. 80 to 99 parts by weight of an (meth)acrylic acid ester monomer;
 ii. 0.5 to 15 parts by weight of an acid functional ethylenically unsaturated monomer;
 iii. 0 to 20 parts by weight of a non-acid functional, ethylenically unsaturated polar monomer;
 iv. 0 to 5 parts vinyl monomer; and
 v. 0.1 to 5 parts of interpolymerized monomer units of the crosslinking monomer;
 based on 100 parts by weight total monomer.

3. A crosslinkable composition comprising an allyl-functional (meth)acrylate copolymer and a crosslinking monomer of the formula:

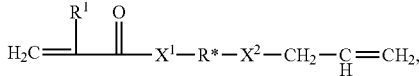

wherein
R$^1$ is H or CH$_3$,
X$^1$ is —O— or —NR$^1$—,
R* is an alkylene group R$^{alkyl}$ optionally substituted by an in-chain ether, ester, amide, urea, thioether or urethane functional group, and
X$^2$ is an ether group.

4. The crosslinkable composition of claim 3 where R$^{alkyl}$ is of the formula: —C$_x$H$_{2x}$—X$^4$—C$_y$H$_{2y}$—, where X$^4$ is selected from a covalent bond, or ether, ester, amide, urea, thioether or urethane functional group, and x and y are independently 2 to 10.

5. The crosslinkable composition of claim 3 wherein the allyl-functional (meth)acrylate copolymer comprises interpolymerized monomer units of:
 i. 80 to 99 parts by weight of an (meth)acrylic acid ester monomer;
 ii. 0.5 to 15 parts by weight of an acid functional ethylenically unsaturated monomer;
 iii. 0 to 20 parts by weight of a non-acid functional, ethylenically unsaturated polar monomer;
 iv. 0 to 5 parts vinyl monomer; and
 v. 0.1 to 5 parts of interpolymerized monomer units of the crosslinking monomer;
 based on 100 parts by weight total monomer.

6. The polymer composition of claim 5 comprising 0.5 to 10 parts by weight of the acid functional, ethylenically unsaturated monomers.

7. The crosslinkable composition of claim 6 wherein the acid functional, ethylenically unsaturated monomer is selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methyl-propane sulfonic acid, vinyl phosphonic acid, and mixtures thereof.

8. The polymer composition of claim 5 comprising 0.5 to 5 parts by weight of the non-acid functional, ethylenically unsaturated polar monomers.

9. The crosslinkable composition of claim 8 wherein said non-acid functional, ethylenically unsaturated polar monomer is selected from 2-hydroxyethyl (meth)acrylate; N-vinylpyrrolidone; N-vinylcaprolactam; acrylamide; t-butyl acrylamide; dimethylamino ethyl acrylamide; N-octyl acrylamide; poly(alkoxyalkyl) (meth)acrylates; poly(vinyl methyl ether); and mixtures thereof.

10. The crosslinkable composition of claim 5 comprising 90 to 95 parts by weight of units of (meth)acrylic acid ester monomers.

11. The crosslinkable composition of claim 5 wherein said copolymer comprises 0.5 to 5 parts by weight of acrylic acid and 1 to 5 parts by weight of a non-acid functional, ethylenically unsaturated polar monomers.

12. A crosslinkable composition comprising:
 an allyl-functional (meth)acrylate copolymer comprising interpolymerized monomer units comprising:
  i. 80 to 99 parts by weight of an (meth)acrylic acid ester monomer;
  ii. 0.5 to 15 parts by weight of an acid functional ethylenically unsaturated monomer;
  iii. 0 to 20 parts by weight of a non-acid functional, ethylenically unsaturated polar monomer;
  iv. 1 to 5 parts of a vinyl monomer selected from vinyl esters, styrene, substituted styrene, vinyl halide, vinyl propionate, and mixtures thereof; and
  v. 0.1 to 5 parts of interpolymerized monomer units of a crosslinking monomer;
 based on 100 parts by weight total monomer; and
 the crosslinking monomer is of the formula:

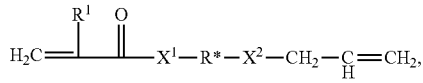

wherein
R¹ is H or CH₃,
X¹ is —O— or —NR¹—,
R* comprises an arylene group or an alkylene group, said alkylene group optionally substituted by an in-chain ether, ester, amide, urea, thioether or urethane functional group,
X² is a covalent bond, an ether group, an ester group, a urea group or a urethane group when R* is an arylene group, and X² is an ether group, an ester group, a urea group or a urethane group when R* is an alkylene group.

13. A syrup polymer composition comprising:
i) a solute (meth)acrylic polymer component comprising polymerized units derived from one or more alkyl (meth)acrylate monomers;
ii) a free-radically polymerizable solvent monomer component; and
wherein the syrup comprises at least one crosslinking monomer and/or the solute (meth)acrylic polymer comprises polymerized units derived from at least one crosslinking monomer of the of the formula:

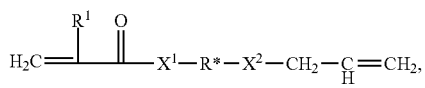

wherein
R¹ is H or CH₃,
X¹ is —O— or —NR¹—,
R* comprises an arylene group, and
X² is a covalent bond, an ether group, an ester group, a urea group or a urethane group.

14. The syrup polymer composition of claim 13 comprising:
a) first component solute copolymer comprising:
    i. 80 to 99.5 parts by weight of an (meth)acrylic acid ester;
    ii. 0.5 to 15 parts by weight of an acid functional monomer;
    iii. 0 to 20 parts by weight of a non-acid functional, ethylenically unsaturated polar monomer;
    iv. 0 to 5 parts vinyl monomer,
    v. 0 to 5 parts of interpolymerized monomer units of the crosslinking monomer, and
b) a second component comprising at least one free-radically polymerizable solvent monomer and optional crosslinking agent, and
c) wherein the solute copolymer and/or the solvent monomer component comprises a total of 0.005 to 5.0 parts by weight of the crosslinking monomer relative to 100 parts by weight of solute copolymer plus solvent monomer.

15. A syrup polymer composition comprising
i) a solute (meth)acrylic polymer component comprising polymerized units derived from one or more alkyl (meth)acrylate monomers;
ii) a free-radically polymerizable solvent monomer component; and
wherein the syrup comprises at least one crosslinking monomer and/or the solute (meth)acrylic polymer comprises polymerized units derived from at least one crosslinking monomer of the of the formula:

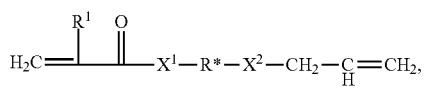

wherein
R¹ is H or CH₃,
X¹ is —O— or —NR¹—,
R* comprises an alkylene group optionally substituted by an in-chain ether, ester, amide, urea, thioether or urethane functional group, and
X² is an ether group.

16. The syrup polymer composition of claim 15 comprising:
a) first component solute copolymer comprising:
    i. 80 to 99.5 parts by weight of an (meth)acrylic acid ester;
    ii. 0.5 to 15 parts by weight of an acid functional monomer;
    iii. 0 to 20 parts by weight of a non-acid functional, ethylenically unsaturated polar monomer;
    iv. 0 to 5 parts vinyl monomer,
    v. 0 to 5 parts of interpolymerized monomer units of the crosslinking monomer, and
b) a second component comprising at least one free-radically polymerizable solvent monomer and optional crosslinking agent, and
c) wherein the solute copolymer and/or the solvent monomer component comprises a total of 0.005 to 5.0 parts by weight of the crosslinking monomer relative to 100 parts by weight of solute copolymer plus solvent monomer.

* * * * *

UNITED STATES PATENT AND TRADEMARK OFFICE
CERTIFICATE OF CORRECTION

PATENT NO. : 10,457,841 B2
APPLICATION NO. : 15/504427
DATED : October 29, 2019
INVENTOR(S) : Corinne Lipscomb et al.

Page 1 of 2

It is certified that error appears in the above-identified patent and that said Letters Patent is hereby corrected as shown below:

On the Title Page

Item (56)
Column 2 (Other Publications), Line 2, Delete "mimiemulsion" and insert -- miniemulsion --, therefor.
Column 2 (Other Publications), Line 8, Delete "Assymmetric" and insert -- Asymmetric --, therefor.

In the Specification

Column 3
Line 58, Delete "monomerin" and insert -- monomer in --, therefor.

Column 6
Line 40, Delete "napthyl," and insert -- naphthyl, --, therefor.

Column 11
Line 50, Delete "froather" and insert -- frother --, therefor.

Column 19
Line 3, Delete "terpthalate)" and insert -- terephthalate) --, therefor.

Column 20
Line 60, Delete "of the of the" and insert -- of the --, therefor.

In the Claims

Column 25
Line 22, In Claim 13, delete "of the of the" and insert -- of the --, therefor.

Column 26

Signed and Sealed this
Eighteenth Day of February, 2020

Andrei Iancu
*Director of the United States Patent and Trademark Office*

Line 15, In Claim 15, delete "of the of the" and insert -- of the --, therefor.